ent Office 3,437,428
Patented Apr. 8, 1969

3,437,428
OXYGEN SCAVENGING FROM CLOSED CONTAINERS
Camilo Quesada, Park Ridge, and Richard W. Neuzil, Downers Grove, Ill., assignors to Universal Oil Products Company, Des Plaines, Ill., a corporation of Delaware
No Drawing. Filed Mar. 21, 1966, Ser. No. 535,680
Int. Cl. B65b *31/00;* B01j *11/16*
U.S. Cl. 23—2
8 Claims

ABSTRACT OF THE DISCLOSURE

Oxygen can be scavenged from a closed container by introducing hydrogen into the container and contacting the resulting gaseous mixture with a catalyst disposed within the container, said catalyst comprising palladium composited on an inorganic oxide base. The catalyst can be promoted with each of iron, a metal selected from the alkali and alkaline earth metals, and chlorine.

The present invention relates to a method for eliminating oxygen from a closed container. More particularly, this invention relates to an improved finely divided catalyst highly active for combining hydrogen with oxygen to remove trace amounts of the latter from a closed container.

In the packaging of foods or other materials detrimentally effected by the presence of oxygen, there may be a shortened "shelf-life" caused by the presence of oxygen within the package or container. In the packaging process, an inert atmosphere may be utilized. However, trace amounts of oxygen, carried into the container with the food or other product during the packaging process, or by reason of diffusion subsequent to packaging, may be present during and after the final sealing of the container to the detriment of the packaged material. Where the oxygen can be entirely removed or converted within the package after sealing, there can be a substantially longer life to the material, particularly in the food products field. The catalytic conversion of oxygen by combining the same with hydrogen appears to be the most desirable means suitable for rapid elimination of oxygen within a container and the present invention is directed to the use of an improved catalyst with respect thereto, said catalyst being disposed within the interior of a sealed package to effect oxygen scavenging therein at ambient conditions.

It is realized that there are many catalytic composites which may be utilized to accelerate the desired reaction for the elimination of oxygen from a closed container. However, not all catalysts provide a sufficiently high activity at ambient conditions. Prior associated work indicates that the platinum group metals are exceptionally active in this respect at the desired conditions, particularly in combination with an iron promoter and impregnated on finely divided particles such as finely divided alumina, silica, or silica-alumina particles. It has now been discovered that the inclusion of an alkali metal, particularly sodium, and/or an alkaline earth metal in the catalyst composite is highly beneficial both as to catalyst activity and stability. It is therefore an object of this invention to provide a method for converting and eliminating residual oxygen from a small air-tight container at ambient temperature conditions, said method being based on an improved catalyst with respect thereto.

In one of its broad aspects the present invention embodies a method of scavenging oxygen from a closed container which comprises introducing hydrogen into said container and contacting the resulting gaseous mixture with a subdivided catalyst disposed within said container, said catalyst comprising a platinum group metal catalytic component composited with an inorganic oxide base material and containing a promoter comprising a metal selected from the group consisting of the alkali and alkaline earth metals, said catalyst further comprising at least about 6 moles of halogen per mole of platinum group metal.

In a somewhat more specific embodiment, the present invention relates to a method of scavenging oxygen from a closed container and comprises introducing hydrogen into said container and contacting the resulting gaseous mixture with a subdivided catalyst disposed within said container, said catalyst comprising from about 0.1 to about 0.5% palladium composited with alumina and containing sodium in from about a 2.5 to 1.0 molar ratio to about a 0.1 to 1.0 molar ratio with said palladium, and further containing iron in from about a 2.5 to 1.0 molar ratio to about a 0.1 to 1.0 molar ratio with said palladium, said catalyst further containing from about 6 to about 10 moles of chlorine per mole of palladium. Other objects and embodiments of this invention will become apparent in the following detailed specification.

Higher chlorine to palladium ratios than herein described may be employed in the catalyst of this invention and result in a desirably active catalyst. However, there is some hazard in handling the highly acid mixes and the 10 to 1 range appears to be generally optimum for providing the highly active catalyst. Also, while there are many refractory oxide base materials which are useful as catalyst supports, it appears that silica and alumina or a combination thereof are the more widely used because of adaptability, relative economy, physical characteristics, etc.

The term "alumina" as used herein is intended to include porous aluminum oxide in the various states of hydration and it is not intended to be limited to just one method of preparation.

Relatively fine particles of alumina may be prepared as microspheres by the spray-drying technique where there is the spraying of an alumina hydrogel slurry into a heated drying and collecting chamber. In addition, alumina precipitates of varying sizes can be prepared by adding ammonia to an aluminum salt solution, as, for example, aluminum chloride, aluminum nitrate, aluminum sulfate, etc. However, when the solution of such salt is contacted with ammonia in conventional precipitating procedures the pH may start at a low level and increase, or conversely, start at a high level and slowly decrease. As a result the precipitate usually has a low solids content and a final filter cake is made up of large agglomerate particles resulting from varying high localized pH levels during the precipitation procedure. Thus, in both the spray-drying and uncontrolled precipitating techniques it is preferable to grind or sieve the alumina to obtain the preferred small particles of less than 100 microns. A commercial alumina, known as Alcoa C–31, has a particle size primarily less than about 100 microns and appears to be a quite satisfactory support material.

It is not necessarily known why the ratio of halogen, preferably chlorine, to the platinum group metal, preferably palladium, contributes to improvement in catalyst activity, but the high ratio seems to improve the distribution of the active component onto the support. Also, it does not appear necessary to have a given amount of residual chlorine remain with the finished catalyst composite, although preferably on the alumina-palladium composite, a residual chloride content of at least about 0.60% by weight thereof seems desirable for an optimum high activity level.

Since in accordance with the present invention, the improved catalyst is to effect the combination of oxygen with hydrogen in a sealed container under ambient conditions, it is, of course, necessary that the catalyst be sufficiently active at normal room or storage temperatures to insure the combination of the gases from diffusion movement. Also, since the catalytic material added to each sealed package will generally be lost upon the disposal of the container or package after it has been opened by the user, it is economically advisable to use minimum quantities of catalyst within each sealed container in order to reduce overall cost. Thus, where palladium, or palladium and platinum or other expensive catalytic components are utilized in the catalyst composite, then such materials will normally be utilized in small quantities which may comprise from about 0.01% to about 0.5% by weight of the catalyst composite. A small container of from about 5 to 15 cubic inches by content may require from about one-tenth to about two grams of catalytic material while the larger containers may require substantially greater quantities of catalyst. The catalyst may, of course, be applied or positioned over one or more distributed areas within the container. The particular advantage of utilizing a finely divided support material is that it permits not only better catalytic contact but a more widely distributed surface area for equivalent weights of catalyst composite within any given size container.

While alkali metals and alkaline earth metals, e.g., sodium, potassium, lithium, calcium, etc., have a promoting effect with respect to the reaction herein contemplated, sodium is substantially more effective and is preferred. Iron has been shown to exert a promoting effect on the desired reaction when composited with the catalyst in a mole ratio of from about 2.5 to 1.0 to about 0.1 to 1.0 with the palladium component. However, iron present in excess of these amounts has been shown to have an inhibiting effect. On the other hand, while sodium itself has a promoting effect, it can be further combined with iron as a promoter to give a more active catalyst than is obtainable with iron alone as will appear from the appended examples. A catalyst comprising sodium in a mole ratio of from about 2.5 to 1.0 to about 0.1 to 1.0 with palladium, and preferably comprising an equimolar amount of sodium and palladium, is suitable.

Impregnation of the carrier material can be accomplished in any conventional or otherwise convenient manner. One suitable method comprises a preimpregnation of the carrier material with the alkali metal and/or alkaline earth metal. For example, the carrier material is soaked, dipped, suspended or otherwise immersed in an aqueous solution of a soluble compound of the selected alkali and/or alkaline earth metal, for example, sodium nitrate, the concentration thereof being such as to insure a final catalyst comprising from about a 2.5 to 1 to about 0.1 to 1 mole ratio with the platinum group metal component. The impregnating solution is thereafter evaporated from the carrier material and the resulting composite dried and calcined. This preimpregnated carrier material is thereafter soaked, dipped, suspended or otherwise immersed in an aqueous solution of a soluble compound of the catalytic component, the concentration thereof being such as to insure a final catalyst comprising at least about 0.1% of the platinum group metal component. The iron promoter can be similarly impregnated on the carrier material when so desired either prior to the platinum group metal, subsequent thereto or concurrently therewith as from a common solution, the concentration of iron being such as to insure a final catalyst comprising iron and a platinum group metal in a molar ratio of from about 2.5 to 1.0 to about 0.1 to 1.0, an equimolar ratio being most suitable. Compounds of the metals of the platinum group which can be thus utilized include preferably chloropalladic acid, but also ammonium chloropalladinate, palladous chloride, palladic chloride, etc., while suitable iron compounds include preferably ferric chloride, but also ferric bromide, ferric fluoride, ferric nitrate, ferric sulfate, ferric acetate, and the like. In any case the impregnating solution is subsequently decanted or evaporated from the impregnated carrier material which is thereafter heated to form the corresponding oxides of the metallic components.

Alternatively, the iron promoter can be incorporated in the carrier material, for example, by addition of ferric chloride to an alumina sol from which the carrier material is formed. However, a catalyst prepared in this manner has been somewhat less effective than one prepared by the aforementioned impregnation procedure.

Although the precise means by which the catalytic component is combined with the carrier material is not known, it is believed that it exists in some physical association or chemical complex therewith. Thus, the palladium may be present as such, or as a chemical compound or in physical association with the refractory inorganic oxide, or with the promoter component, or in some combination with both.

The catalytic impregnation may be carried out when so desired in the presence of an additive component such as, for example, thiomalic acid, which appears to be effective in having the palladium impregnate the surface portion of the catalyst support whereby all of the activating component is available for carrying out the catalytic combination of the oxygen with the hydrogen. Varying amounts of thiomalic acid may be utilized. However, it has been found that about a 3 to 1 molar ratio of thiomalic to chloropalladic acid provides a desired form of surface impregnation.

A preferred catalyst preparation step also includes effecting the reduction of the impregnated, dried, and oxidized catalyst composite in the presence of hydrogen or other reducing gas, with such reducing step being carried out for one or more hours at an elevated temperature of at least 345° C.

As indicated hereinabove, in order to insure an effective conversion and elimination of the residual oxygen content within a sealed container at ambient conditions, it is necessary to insure the presence of hydrogen, for example, by adding a given quantity of hydrogen to the controlled atmosphere which is maintained for the packaging operations. The amount of added hydrogen shall be something more than the stoichiometric amount necessary to combine with the oxygen in the container in question and may be readily correlated with the average amount of oxygen which is found to be present in connection with a given packaging step for any given oxidizable material. In other words, preferably, the hydrogen shall be present in at least twice the molar quantity of the residual oxygen content for the particular packaging step whereby such oxygen may be rapidly catalytically combined with the hydrogen to form water vapor or droplets within the container upon diffusive movement of the gases into contact with the catalyst positioned interiorly of said container.

Inasmuch as the entrained air or oxygen content carried into a sealed container is presumably distributed substantially uniformly throughout the entire interior, it is necessary that the catalytic conversion of the oxygen take place in a quiescent state primarily by diffusion movement of the oxygen and hydrogen into contact with the catalyst. The catalyst may be positioned in a compact form or state within a central location within the interior of the container. However, from the practical aspects, the catalyst may be held or applied in a distributed manner along the interior surface of the container and thus provide an extended surface area for diffusion contact with the entrained oxygen and hydrogen within the package. Packaging of food is frequently carried out by the use of small containers or cartons such that they are useful in providing individual servings or a small number of servings. As a result, the entire quantity of food will be relatively close to the interior wall surface of the container and the catalyst is advantageously attached to or applied to at least a portion of the interior wall surface thereof.

The terms "sealed" and "air-tight" as used herein in connection with packaging or container means, shall have reference to the fact that such container means is formed or fabricated of a material, or utilizes a liner, that is at least generally considered impervious to the passage of air under normal handling conditions for an extended period of time and, in addition, such container utilizes a tight cover, adhesive seal, wrapping, or the like, that precludes air passage for an extended period of time. Such extended period of time should be beyond that which the goods would normally be used or consumed in the course of usual commercial conditions. The containers for incorporating the catalyst and holding the food or oxidizable goods may be actually completely sealed metal cans, glass jars, plastic containers, etc., or they may be made of plastic wrap materials, aluminum foil, or combinations thereof, as well as of paper or cardboard types of materials which in turn are coated or impregnated with wax or plastic to provide generally air impervious and water-proof surfaces.

The following examples are presented in illustration of the oxygen scavenging capacity of the catalyst of this invention at ambient conditions and of the beneficial effect of an alkali and/or alkaline earth metal promoter with respect thereto. It is not intended that said examples shall serve as an undue limitation on the generally broad scope of the invention as set out in the appended claims.

The catalysts were evaluated by a procedure whereby a standard gas blend of oxygen, hydrogen and nitrogen (2.0% $O_2$, 5.0% $H_2$, and the balance $N_2$) was charged through a bed of the catalyst to be evaluated. The reactor effluent was analyzed for oxygen by means of a Beckman Model 777 laboratory oxygen analyzer and the residence time required to establish a reactor effluent containing 0.1% residual oxygen was determined. The activity number of a catalyst was calculated by the formula $$\frac{t_r}{t_s} \times 100$$

where $t_r$ is the residence time required with the reference catalyst and $t_s$ is the residence time required with the sample in question in each instance to reduce the oxygen level of a standard blend to a certain equilibrium level. In spite of the limited contact time, it was necessary to dilute the catalyst, both sample and reference catalysts, with additional powdered base material (alumina) in ratio of 1 to 5 in order to lower oxygen conversion and establish a measurable amount of oxygen in the reactor effluent. The reactor consisted of a small tubular glass unit about 2.0 centimeters in length and an inside diameter of 0.15 centimeter and incorporated a small piece of filter paper at each end thereof. The catalyst was maintained at 32° C. and the oxygen analyzer reading taken and the residence time determined after the oxygen concentration had been at the desired equilibrium for at least 30 minutes.

Example I

A sodium-free and iron-free palladium containing reference catalyst was prepared. The catalyst preparation consisted in the preparation initially of an impregnating solution by admixing 6.5 milliliters of dilute hydrochloric acid, 0.166 grams of palladium chloride and 46.8 milliliters of water. The impregnating solution thus prepared was poured over 19.9 grams of alumina particles (through 100 mesh) and the resulting slurry evaporated to dryness over a 3 hour period. The impregnated alumina was further dried in air for 1 hour at 100° C. and thereafter oxidized in air at 450° C. for 2.5 hours. After oxidation the catalyst was reduced in a hydrogen atmosphere at 355° C. A nitrogen purge stream was used on the catalyst before and after the reduction step. The catalyst thus prepared had 0.5% palladium on the alumina support. This sodium-free iron-free catalyst was utilized as a reference catalyst with an activity of 100.

Example II

A palladium catalyst containing an iron promoter was prepared. The catalyst preparation consisted in the preparation initially of an impregnating solution by heating a mixture consisting of 3.33 milliliters of an aqueous ferric chloride solution (1.2% Fe), 5.5 milliliters of dilute hydrochloric acid, 0.166 gram of palladium chloride and 46.8 milliliters of water at 60° C. until all solids were in solution. The impregnating solution thus prepared was poured over 19.9 grams of alumina particles (through 100 mesh) and the resulting slurry was evaporated to dryness over a 3 hour period. The impregnated alumina was further dried in air for 1 hour at 100° C. and thereafter oxidized in air at 450° C. for 2.5 hours. After oxidation, the catalyst was reduced in a hydrogen atmosphere at 355° C. A nitrogen purge stream was used on the catalyst before and after the reduction step. The catalyst thus prepared had 0.5% palladium and 0.2% iron on the alumina support. This iron promoted palladium catalyst had an activity of 125.

Example III

A sodium-iron promoted palladium catalyst was prepared. The catalyst preparation consisted in the preparation initially of an impregnating solution consisting of 0.37 gram of sodium nitrate in 40 milliliters of water. The alumina base material (19.9 grams) was immersed in the solution which was then evaporated to dryness over a 3 hour period. The sodium impregnated alumina was then heated to 550° C. over a period of 1 hour and further calcined at 550° C. for an additional 2 hours. A second impregnating solution was prepared by heating together at 60° C. 3.33 milliliters of an aqueous ferric chloride solution (1.2% Fe), 5.5 milliliters of dilute hydrochloric acid, and 0.166 gram of palladium chloride and 46.8 milliliters of water. The impregnating solution thus prepared was poured over the alumina base material and the resulting slurry was evaporated to dryness over a 3 hour period. The impregnated alumina was further dried in air for 1 hour at about 100° C. and thereafter oxidized in air for 2.5 hours at 450° C. After oxidation the catalyst was heated at 355° C. in a hydrogen atmosphere. A nitrogen purge stream was used on the catalyst before and after the reduction step. The catalyst thus prepared comprised 0.21% iron, 0.5% palladium and 0.44% sodium on the alumina carrier material. This sodium-iron promoted palladium catalyst had an activity of 188.

We claim as our invention:

1. In a method of scavenging oxygen from a closed container wherein hydrogen is introduced into said container and the resulting gaseous mixture is contacted with a subdivided platinum group metal catalyst disposed within said container, the improvement therein which comprises utilizing a catalyst comprising palladium composited on an inorganic oxide base material and containing from about 0.1 to about 2.5 moles of iron per mole of palladium, from about 0.1 to about 2.5 moles of a metal selected from the group consisting of the alkali and alkaline earth metals per mole of palladium and at least about 6 moles of chlorine per mole of palladium.

2. The method of claim 1 further characterized in that the final catalyst composite contains from about 0.1 to about 0.5% palladium.

3. The method of claim 2 further characterized in that said promoter comprises sodium in from about a 2.5 to 1.0 to about an 0.1 to 1.0 molar ratio with the palladium component.

4. The method of claim 3 further characterized in that said iron is present in about an equimolar ratio with the palladium component.

5. The method of claim 4 further characterized in that said catalyst contains from about 6 to about 10 moles of chlorine per mole of palladium.

6. The method of claim 5 further characterized in that said inorganic oxide base material is an alumina-containing base material.

7. The method of claim 6 further characterized in that said inorganic oxide base material is alumina.

8. The method of claim 6 further characterized in that said inorganic oxide base material is silica-alumina.

References Cited

UNITED STATES PATENTS

| 3,123,491 | 3/1964 | Beaumont | 99—189 X |
| 3,255,020 | 6/1966 | Ferrell | 99—189 |

FOREIGN PATENTS 613,787   1/1961   Canada.

E. C. THOMAS, *Primary Examiner.*

U.S. Cl. X.R.

99—189; 252—441, 442, 460, 466, 473, 474